United States Patent
Hari et al.

(10) Patent No.: US 10,374,515 B2
(45) Date of Patent: Aug. 6, 2019

(54) SWITCHED MODE POWER SUPPLY WITH DYNAMIC FREQUENCY FOLDBACK

(71) Applicant: SEMICONDUCTOR COMPONENTS INDUSTRIES, LLC, Phoenix, AZ (US)

(72) Inventors: Ajay Karthik Hari, Scottsdale, AZ (US); Bryan Wayne McCoy, Chandler, AZ (US); Thomas Ciccone, Tempe, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/177,723

(22) Filed: Nov. 1, 2018

(65) Prior Publication Data

US 2019/0074765 A1  Mar. 7, 2019

Related U.S. Application Data

(63) Continuation of application No. 15/711,825, filed on Sep. 21, 2017, now Pat. No. 10,148,181.
(Continued)

(51) Int. Cl.
*H02M 3/158* (2006.01)
*H02M 1/44* (2007.01)
(Continued)

(52) U.S. Cl.
CPC .......... *H02M 3/158* (2013.01); *H02J 7/0052* (2013.01); *H02M 1/126* (2013.01); *H02M 1/44* (2013.01);
(Continued)

(58) Field of Classification Search
CPC ........ H02M 1/44; H02M 3/156; H02M 3/158; H02M 3/33523; H02M 2001/0032;
(Continued)

(56) References Cited

U.S. PATENT DOCUMENTS

| 4,975,823 | A | 12/1990 | Rilly et al. |
| 6,061,257 | A | 5/2000 | Spampinato et al. |
| 6,661,238 | B2 | 12/2003 | Murata et al. |
| 7,468,896 | B2* | 12/2008 | Gong ................ H02M 3/33507 363/21.12 |
| 7,869,229 | B2* | 1/2011 | Huynh ............... H02M 3/33523 340/636.12 |

(Continued)

OTHER PUBLICATIONS

NCP1246, "Fixed Frequency Current Mode Controller for Flyback Converters," Product Data Sheet, Semiconductor Components Industries, LLC, Oct. 2014, 39 pages, NCP1246/D, Semiconductor Components Industries, LLC, P.O. Box 5163, Denver, Colorado 80217 United States.
(Continued)

*Primary Examiner* — Matthew V Nguyen
(74) *Attorney, Agent, or Firm* — Polansky & Associates, P.L.L.C.; Paul J. Polansky

(57) ABSTRACT

In one form, a switched mode power supply controller with frequency foldback includes a pulse width modulator responsive to a clock signal to generate a drive signal having a pulse width that varies in response to a feedback signal, and a variable frequency oscillator having a first input for receiving the feedback signal, a control input for receiving a control signal defining a foldback starting frequency, a foldback ending frequency, a foldback starting voltage, and a foldback ending voltage, and an output for providing the clock signal having a variable frequency that varies over a range between the foldback starting frequency and the foldback ending frequency as the feedback signal varies between the foldback starting voltage and the foldback (Continued)

ending voltage, respectively. The control signal is user programmable for at least one of the foldback starting frequency, the foldback ending frequency, the foldback starting voltage, and the foldback ending voltage.

36 Claims, 6 Drawing Sheets

Related U.S. Application Data

(60) Provisional application No. 62/405,659, filed on Oct. 7, 2016.

(51) Int. Cl.
*H02M 1/12* (2006.01)
*H02J 7/00* (2006.01)
*H02M 3/335* (2006.01)
*H02M 1/00* (2006.01)
*H02M 1/34* (2007.01)

(52) U.S. Cl.
CPC ............... *H02M 3/33523* (2013.01); *H02M 2001/0032* (2013.01); *H02M 2001/0054* (2013.01); *H02M 2001/344* (2013.01); *Y02B 40/90* (2013.01); *Y02B 70/1491* (2013.01); *Y02B 70/16* (2013.01)

(58) Field of Classification Search
CPC ..... H02M 2001/0054; H02M 2001/344; H02J 7/00; H02J 7/0052
See application file for complete search history.

(56) References Cited

U.S. PATENT DOCUMENTS

| | | | |
|---|---|---|---|
| 10,148,181 B2* | 12/2018 | Hari .................. | H02M 3/33523 |
| 2012/0188799 A1 | 7/2012 | Park et al. | |
| 2012/0326689 A1 | 12/2012 | Rice | |
| 2013/0027996 A1* | 1/2013 | Baurle .................. | H02M 3/156 |
| | | | 363/78 |
| 2013/0033902 A1* | 2/2013 | Zhang ............... | H02M 3/33523 |
| | | | 363/15 |
| 2016/0134186 A1* | 5/2016 | Saint-Pierre ............ | H02M 1/44 |
| | | | 363/19 |

OTHER PUBLICATIONS

NCP1360, NCP1365, "Low Power Offline Constant Current & Constant Voltage Primary Side PWM Current-Mode Controller with/without High Voltage Startup Current Source," Product Data Sheet, Semiconductor Components Industries, LLC, Oct. 2015, 29 pages, NCP1360/D Rev. 1, Semiconductor Components Industries, LLC, P.O. Box 5163, Denver, Colorado 80217 United States.

* cited by examiner

| FOLDBACK STARTING VOLTAGE (V) | FOLDBACK ENDING VOLTAGE (V) | FOLDBACK STARTING FREQUENCY (kHz) | FOLDBACK ENDING FREQUENCY (kHz) | FOLDBACK FREQUENCY RATE (kHz/V) |
|---|---|---|---|---|
| 0.4 | 0.7 | 25 | 50 | 83 |
| 0.4 | 0.7 | 25 | 250 | 750 |
| 0.4 | 2.5 | 25 | 50 | 12 |
| 0.4 | 2.5 | 25 | 250 | 107 |

FIG. 3

SWITCHED MODE POWER SUPPLY WITH DYNAMIC FREQUENCY FOLDBACK

FIELD OF THE DISCLOSURE

This disclosure relates generally to power converters, and more specifically to switched mode power supplies that operate under widely varying load conditions.

BACKGROUND

Switched mode power supplies can be used to create a direct current (DC) voltage from an alternating current (AC) voltage by switching current through an energy storage element such as a transformer. The duty cycle of the switching is controlled to regulate the output voltage to a desired level. Switched mode power supplies are generally efficient at heavier loads but less efficient at lighter loads. Two popular types of isolated switched mode power supplies are forward mode and flyback mode converters.

Flyback converters are common in AC voltage to DC voltage applications. A flyback converter is based on a flyback transformer that alternately builds up flux in the magnetic core and transfers energy to the output. When current is switched through the primary winding, the primary current in the transformer increases, storing energy within the transformer. When the switch is opened, the primary current in the transformer drops, inducing a voltage on the secondary winding. The secondary winding supplies current into the load. A controller varies the on- and off-times of a primary switch in series with the primary winding to regulate the output voltage to a desired level.

Flyback converters can be configured to switch additional reactive elements in parallel to the primary winding using a topology known as active clamp flyback (ACF). ACF converters can reduce electric stress on components and improve efficiency by achieving close to zero volt switching (ZVS) of the primary switch and to produce clean drain waveforms without any ringing. They also allow soft increase in secondary current. However while ACF converters have high efficiency at medium and heavy loads, their efficiency decreases at lighter loads due to continuous conduction losses from magnetizing current that continuously circulates on the primary side of the transformer due to the additional reactive elements. Moreover, ACF converters are not suitable for other techniques that improve efficiency at light loads such as cycle skipping and frequency foldback.

In flyback converters, it may be advantageous in certain applications to increase the frequency of operation to 1 megahertz (MHz) and beyond. When the frequency of operation is increased, the primary magnetizing inductance and the output capacitance may be reduced. However there is a tradeoff between size reduction and increased frequency on the one hand and low standby power on the other. Converters consume less standby power if switching losses are reduced when operating at light loads or no load. Recently, certain regulatory agencies have set strict standards for efficiency and have encouraged the development of power supply controllers that are capable of both high frequency and low frequency operation to operate at low frequencies at light loads and no load. Thus the frequency change from no load to full load may vary widely based on the chosen frequency of operation. In addition, users may want to start or stop the frequency foldback under various load conditions in different applications. Known converters, however, are dedicated to certain operating conditions and are unable to satisfy these requirements at the same time.

BRIEF DESCRIPTION OF THE DRAWINGS

The present disclosure may be better understood, and its numerous features and advantages made apparent to those skilled in the art by referencing the accompanying drawings, in which:

FIG. 3 illustrates a table showing an example of different operating points supported by the dynamic frequency foldback of the switched mode power converter of FIG. 1;

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
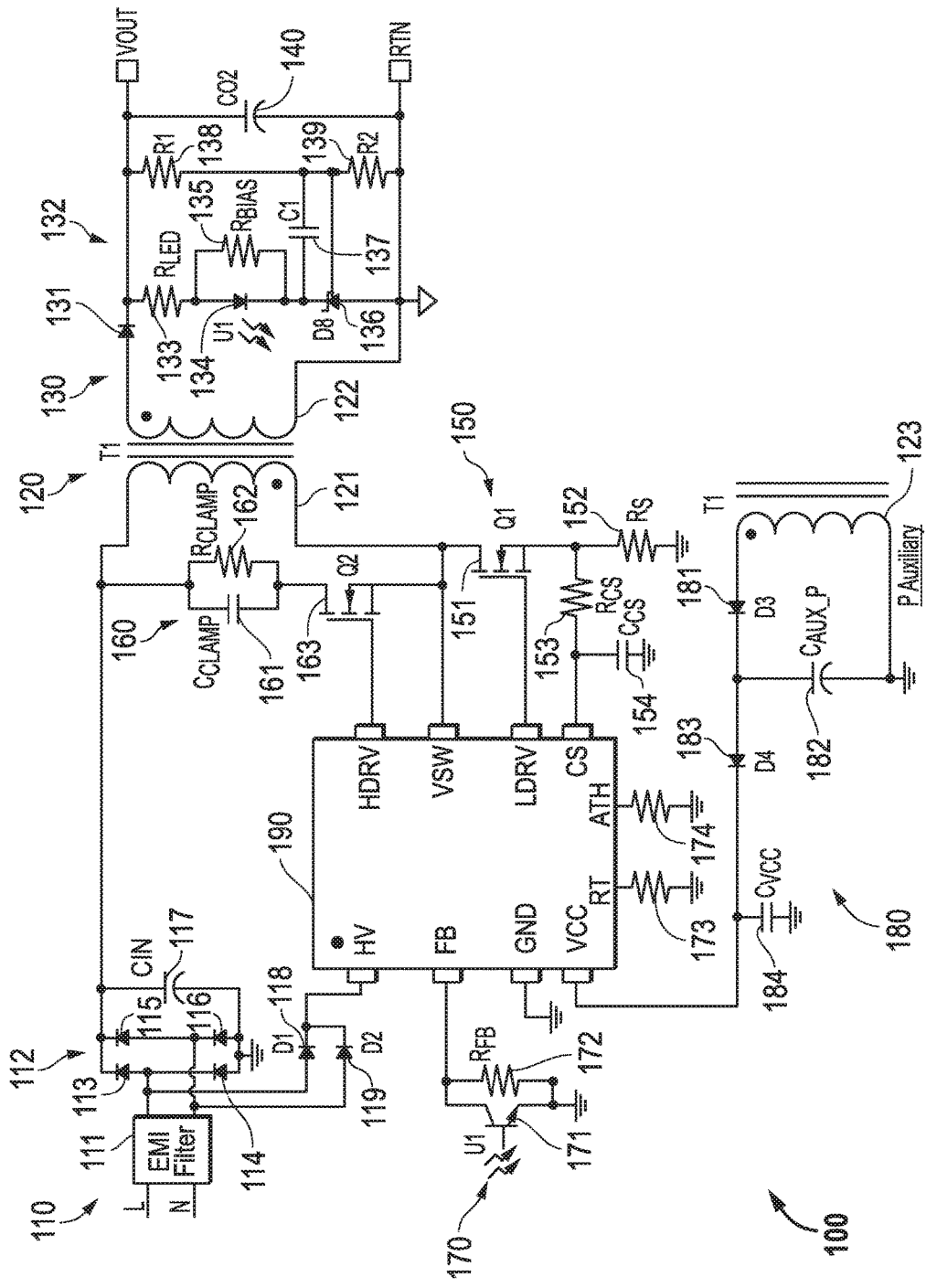
FIG. 1 illustrates in partial block diagram and partial schematic form a switched mode power converter with dynamic frequency foldback according to an embodiment of the present invention.

FIG. 1 illustrates in partial block diagram and partial schematic form a switched mode power converter 100 with dynamic frequency foldback according to an embodiment of the present invention. Switched mode power converter 100 is an active clamp flyback (ACF) converter that uses hysteretic ACF switching at normal loads, frequency foldback at light loads, and skip mode at very light loads or in no load conditions to improve its efficiency.

Switched mode power converter 100 includes generally a front-end circuit 110, a flyback transformer 120, an output circuit 130, an output capacitor 140, a switching stage 150, and active clamp stage 160, a feedback and programming circuit 170, an auxiliary supply circuit 180, and a switched mode power supply controller 190.

Front-end circuit 110 includes an electromagnetic interference (EMI) filter 111, a diode bridge rectifier 112, an input capacitor 117, and diodes 118 and 119. EMI filter 111 has inputs labeled "L" and "N" for connection to an alternating current (AC) mains, and first and second outputs. Diode bridge rectifier 112 includes diodes 113, 114, 115, and 116. Diode 113 has an anode connected to the first output of EMI filter 111, and a cathode. Diode 114 has an anode connected to a primary ground, and a cathode connected to the first output of EMI filter 111. Diode 115 has an anode connected to the second output of EMI filter 111, and a cathode connected to the cathode of diode 113. Diode 116 has an anode connected to primary ground, and a cathode connected to the second output of EMI filter 111. Input capacitor 117 has a first terminal connected to the cathodes of diodes 113 and 115, and a second terminal connected to primary ground. Diode 118 has an anode connected to the first output of EMI filter 111, and a cathode. Diode 119 has an anode connected to the second output of EMI filter 111, and a cathode connected to the cathode of diode 118.

Flyback transformer 120 is a magnetic core transformer having a primary winding 121, a secondary winding 122, and an auxiliary winding 123. Primary winding 121 has a first end connected to the cathodes of diodes 113 and 115, and a second end. Secondary winding 122 and auxiliary winding 123 each have first and second ends.

Output circuit 130 includes a diode 131 and a feedback circuit 132. Diode 131 has an anode connected to the first end of secondary winding 122, and a cathode for providing an output voltage labeled "$V_{OUT}$" to a load, not shown in FIG. 1. Feedback circuit 132 includes a resistor 133, a photodiode 134, a resistor 135, a Zener diode 136, a capacitor 137, and resistors 138 and 139. Resistor 133 has a first terminal connected to the anode of diode 131, and a second terminal. Photodiode 134 has an anode connected to the second terminal of resistor 133, and a cathode. Resistor 135 has a first terminal connected to the second terminal of resistor 133, and a second terminal connected to the cathode of photodiode 134. Zener diode 136 has a cathode connected to the cathode of photodiode 134 and to the second terminal of resistor 135, and an anode connected to a secondary ground. Capacitor 137 has a first terminal connected to the cathode of photodiode 134, to the cathode of Zener diode 136, and to the second terminal of resistor 135, and a second terminal. Resistor 138 has a first terminal connected to the cathode of diode 131 and to the first terminal of resistor 133, and a second terminal connected to the second terminal of capacitor 137. Resistor 139 has a first terminal connected to the second terminal of capacitor 137 and to the second terminal of resistor 138, and a second terminal connected to secondary ground.

Output capacitor 140 has a first terminal connected to the cathode of diode 131, the first terminal of resistor 133, and the first terminal of resistor 138, and a second terminal connected to secondary ground.

Switching stage 150 includes a transistor 151, resistors 152 and 153, and a capacitor 154. Transistor 151 is an N-channel metal-oxide-semiconductor (MOS) transistor having a drain connected to the second end of primary winding 121, a gate, and a source. Resistor 152 has a first terminal connected to the source of transistor 151, and a second terminal connected to primary ground. Resistor 153 has a first terminal connected to the source of transistor 151 and to the first terminal of resistor 152, and a second terminal. Capacitor 154 has a first terminal connected to the second terminal of resistor 153, and a second terminal connected to primary ground.

Active clamp stage 160 includes a capacitor 161, a resistor 162, and a transistor 163. Capacitor 161 has a first terminal connected to cathodes of diodes 113 and 115 and to the first terminal of input capacitor 117, and a second terminal. Resistor 162 has a first terminal connected to cathodes of diodes 113 and 115 and to the first terminal of input capacitor 117, and a second terminal connected to the second terminal of capacitor 161. Transistor 163 is an N-channel MOS transistor having a drain connected to the second terminals of capacitor 161 and resistor 162, a gate, and a source connected to the second end of primary winding 121 and to the drain of transistor 151.

Feedback and programming circuit 170 includes a phototransistor 171, and resistors 172, 173, and 174. Phototransistor 171 has a collector, a base optically coupled to photodiode 134, and an emitter connected to primary ground. Resistor 172 has a first terminal connected to the collector of phototransistor 171, and a second terminal connected to primary ground. Resistor 173 has a first terminal, and a second terminal connected to primary ground. Resistor 174 has a first terminal, and a second terminal connected to primary ground.

Auxiliary supply circuit 180 includes a diode 181, a capacitor 182, a diode 183, and a capacitor 184. Diode 181 has an anode connected to the first end of auxiliary winding 123, and a cathode. Capacitor 182 has a first terminal connected to the cathode of diode 181, and a second terminal connected to primary ground. Diode 183 has an anode connected to the cathode of diode 181 and to the first terminal of capacitor 182, and a cathode. Capacitor 184 has a first terminal connected to the cathode of diode 183, and a second terminal connected to primary ground.

Switched mode power supply controller 190 is an integrated circuit that controls the operation of switched mode power converter 100. Switched mode power supply controller 190 has a set of terminals labeled "HV", "FB", "GND", "VCC", "RT", "ATH", "CS", "LDRV", "VSW", and "HDRV". The HV terminal is connected to the cathodes of diodes 118 and 119. The FB terminal is connected to the collector of phototransistor 171 and to the first terminal of resistor 172. The GND terminal is connected to primary ground. The VCC terminal is connected to the cathode of diode 183 and to the first terminal of capacitor 184. The RT terminal is connected to the first terminal of resistor 173. The ATH terminal is connected to the first terminal of resistor 174. The CS terminal is connected to the second terminal of resistor 153 and to the first terminal of capacitor 154. The LDRV terminal is connected to the gate of transistor 151. The VSW terminal is connected to the second end of primary winding 121, the drain of transistor 151, and the source of transistor 163. The HDRV signal is connected to the gate of transistor 164.

Front-end circuit 110 has L and N inputs for coupling to an AC mains. Diode bridge rectifier 112 converts the sinusoidal AC mains signal into a half-wave rectified (haversine) signal and input capacitor 117 smoothes this signal to form a smoothed haversine signal that is provided the first end of primary winding 121 of flyback transformer 120.

Output circuit 130 rectifies the signal at the first end of secondary winding 122. Feedback circuit 132 provides an isolated, optical feedback signal proportional to a difference between $V_{OUT}$ and the breakdown voltage of Zener diode 136, while filtering high frequency fluctuations in $V_{OUT}$. Photodiode 134 and phototransistor 171 are isolated and logically separated between the secondary side of flyback transformer 120 and the primary side of flyback transformer 120, respectively, but are implemented together as an optocoupler. Output capacitor 140 provides smoothing for $V_{OUT}$ during load transients.

In switching stage 150, transistor 151 is made conductive to cause current flow through primary winding 121 of flyback transformer 120. Resistor 152 is a current sense resistor whose first terminal provides a voltage that indicates the amount of current flowing through primary winding 121. The current sense signal allows for PWM control as well as cycle-by-cycle current limiting. Resistor 153 and capacitor 154 operate to filter out high frequency content of the current sense signal.

Active clamp stage 160 forms an active clamp and transistor 163 is conductive during portions of the off times of transistor 151 to allow for zero-voltage switching (ZVS). Switched mode power supply controller 190 uses the VSW input to determine when to deactivate the active clamp.

Feedback and programming circuit 170 provides a mechanism to regulate $V_{OUT}$ and also to program the foldback function. Phototransistor 171 conducts a current proportional to $V_{OUT}$ to form a feedback signal. Switched mode power supply controller 190 uses currents conducted by resistors 173 and 174 to determine the foldback ending frequency and the foldback ending voltage.

Auxiliary supply circuit 180 provides a power supply voltage labeled "VCC" that powers the internal circuits of switched mode power supply controller 190. Switched mode power supply controller 190 is an integrated circuit controller that has various functions useful in the implementation of an ACF controller that are not disclosed in detail.

Switched mode power converter 100 is an ACF converter that switches current through the primary side of flyback transformer 120 to generate output voltage $V_{OUT}$. ACF converters can reduce electric stress on components and improve efficiency by achieving close to zero volt switching (ZVS) of the primary switch and to produce clean drain waveforms without any ringing. They also allow soft increase in secondary current.

For medium and heavy loads, switched mode power converter 100 operates in ACF mode. Switch mode power converter 100 includes not only transistor 151, but also a reactive element—capacitor 161—in parallel with primary winding 121 of flyback transformer 120 that resonates when transistor 163 is conductive. Switched mode power supply controller 190 makes transistor 163 conductive during portions of the off times of transistor 151 and varies the duty cycle of transistor 163. In this way switched mode power converter 100 uses the energy stored in parasitics to achieve a zero voltage switch (ZVS) instead of dissipating the energy in a snubber circuit. Switched mode power converter 100 also reduces spikes that occur due to switching transients, resulting in lower electromagnetic interference (EMI).

For light loads, switched mode power converter 100 operates as a discontinuous conduction mode (DCM) flyback converter with frequency foldback. In DCM foldback mode, transistor 163 remains nonconductive such that switched mode power converter 100 operates as a conventional flyback converter. However switched mode power converter 100 also folds back its operating frequency to improve converter efficiency as the load lightens and to meet the strict requirements for standby and system efficiency imposed by various worldwide regulatory authorities.

For very light loads, switched mode power converter 100 operates in a skip mode, in which it keeps transistor 151 non-conductive for periods of time until VOUT falls enough to resume switching. The frequency of the oscillator used for switching the PWM converter is held at a constant, low frequency that is chosen to be above the human audible frequency range, for example 25 kilohertz (kHz).

In order to provide switched mode power supply controller 190 in integrated circuit form, it is desirable to provide enough flexibility to meet varying design requirements. Switched mode power supply controller 190 provides this flexibility by providing dynamic frequency foldback. Dynamic frequency foldback provides a foldback range that is programmable in terms of one or more of the foldback start frequency and the foldback stop frequency, and the feedback signal voltages corresponding to these frequencies.

Figure 2:
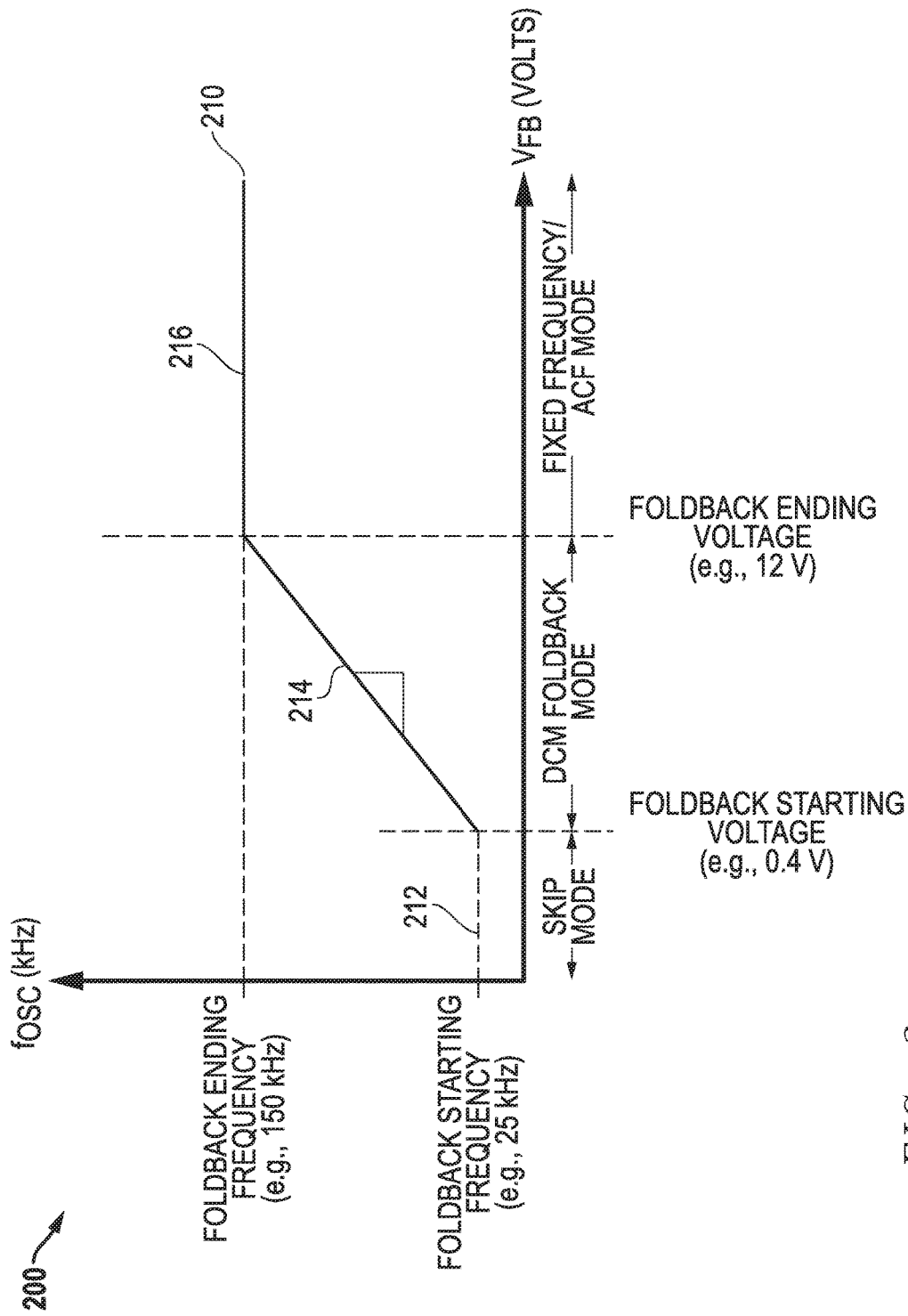
FIG. 2 illustrates a graph of the dynamic frequency foldback implemented by the switched mode power converter of FIG. 1.

FIG. 2 illustrates a graph 200 of the dynamic frequency foldback implemented by switched mode power converter 100 of FIG. 1. In graph 200, the horizontal axis represents feedback pin voltage labeled "$V_{FB}$" in volts, and the vertical axis represents the oscillator frequency in kilohertz (kHz). Graph 200 includes a waveform 210 showing the oscillator frequency versus $V_{FB}$. There are two points of interest along the horizontal axis, including a FOLDBACK STARTING VOLTAGE and a FOLDBACK ENDING VOLTAGE, as well as corresponding points along the vertical axis, a FOLDBACK STARTING FREQUENCY and a FOLDBACK ENDING FREQUENCY.

Also shown along the horizontal axis are three modes of operation: a SKIP MODE for values of $V_{FB}$ less than the FOLDBACK STARTING VOLTAGE, a DCM foldback mode for values of $V_{FB}$ between the FOLDBACK STARTING VOLTAGE and the FOLDBACK ENDING VOLTAGE, and a fixed frequency or ACF mode for values of $V_{FB}$ greater than the FOLDBACK ENDING VOLTAGE. As used in this description, the foldback "starting" and "ending" voltages represent voltages moving from left to right along the horizontal axis, whereas the foldback "starting" and "ending" frequencies represent frequencies moving from bottom to top along the vertical axis. In an actual embodiment, the load may lighten, causing a movement to the left along the horizontal axis, or increase, causing a movement to the right along the horizontal axis, at different times based on the state of the load.

In light load conditions, switched mode power converter 100 is unable to keep $V_{OUT}$ regulated to the desired level using conventional PWM techniques. The high voltage on VOUT increases the conduction of phototransistor 171 and reduces $V_{FB}$ to a level between the FOLDBACK STARTING VOLTAGE and FOLDBACK ENDING VOLTAGE as shown in portion 214 of waveform 210. The oscillator operates at a frequency proportional to $V_{FB}$, i.e. portion 214 has a constant slope. As $V_{FB}$ varies between the FOLDBACK STARTING VOLTAGE and FOLDBACK ENDING VOLTAGE, $f_{OSC}$ varies proportionally between the FOLDBACK STARTING FREQUENCY and FOLDBACK ENDING FREQUENCY. In light load conditions, the reduction in the switching frequency below the foldback ending frequency may be enough to attain a stable operating point. The reduction in frequency of operation reduces power consumption and helps to meet the efficiency standards set by government regulatory bodies.

In very light load conditions, switched mode power converter 100 is unable to keep $V_{OUT}$ regulated to the desired level and $V_{FB}$ falls below the FOLDBACK STARTING VOLTAGE, for example below 0.4 volts. As shown in a dashed portion 212 of waveform 210, the oscillator operates in skip mode with $f_{OSC}$ maintained at the FOLDBACK STARTING FREQUENCY. The FOLDBACK STARTING FREQUENCY is chosen to be a small amount above the human audible frequency range, for example 25 kHz, to avoid creating audible noise.

In medium or heavy load conditions, $V_{FB}$ is above the FOLDBACK ENDING VOLTAGE, and switched mode power converter 100 is able to regulate VOUT to the desired level. The mode of operation in medium or heavy loads depends on the type of converter. If switched mode power converter 100 is a traditional flyback converter, it operates in a fixed frequency mode at the FOLDBACK ENDING FREQUENCY. If switched mode power converter 100 is an ACF converter, however, it operates in ACF mode, in which the switching speed is not fixed but switching depends on the magnetization condition of the transformer's primary winding. In this case, the on time of transistor 151 will vary with the amount of output current provided to the load.

To take a concrete example, the FOLDBACK STARTING VOLTAGE and FOLDBACK ENDING VOLTAGE can be 0.4 volts and 1.2 volts, respectively, and the FOLDBACK STARTING FREQUENCY and FOLDBACK ENDING FREQUENCY can be 25 kHz and 150 kHz, respectively. However according to the embodiments disclosed herein, a single integrated circuit power supply controller has programmable inputs that can vary these parameters for different applications. Thus a single integrated circuit design can be adapted for different applications, avoiding the need to design multiple integrated circuits with fixed foldback characteristics. Some further examples will now be explained.

FIG. 3 illustrates a table 300 showing an example of different operating points supported by the dynamic frequency foldback of switched mode power converter 100 of FIG. 1. Table 300 has five columns with four rows, each representing a different example. The five columns represent FOLDBACK STARTING VOLTAGE, FOLDBACK ENDING VOLTAGE, FOLDBACK STARTING FREQUENCY, FOLDBACK ENDING FREQUENCY, and foldback frequency rate. For each of the four examples, the foldback starting voltage is set internally to 0.4 volts. With a fixed starting voltage, a user can alter the corresponding VOUT voltage based on the design of the feedback circuit. Also for each of the four examples, the foldback starting frequency is set internally to 25 kHz, a frequency that is low but is also safely above the human audible range.

The first example corresponds to a high primary magnetizing inductance and load capacitance and a low foldback range. The user sets the feedback ending voltage to 0.7 volts and the foldback ending frequency to 50 kHz. These parameters provide a small slope for the foldback curve and a foldback frequency rate of 83 kHz/volt with a low ending frequency. The second example corresponds to a low primary magnetizing inductance and load capacitance and a low foldback range. The user sets the feedback ending voltage to 0.7 volts and the foldback ending frequency to 50 kHz. These parameters provide a very large slope for the foldback curve of 750 kHz/volt with a high ending frequency. The third example corresponds to a high primary magnetizing inductance and load capacitance and a high foldback range. The user sets the feedback ending voltage to 2.5 volts and the foldback ending frequency to 50 kHz. These parameters provide a very small slope for the foldback curve of 12 kHz/volt with a low ending frequency. The fourth example corresponds to a low primary magnetizing inductance and load capacitance and a high foldback range. The user sets the feedback ending voltage to 2.5 volts w the foldback ending frequency to 250 kHz. These parameters provide a moderately large slope for the foldback curve of 107 kHz/volt with a high ending frequency.

Figure 4:
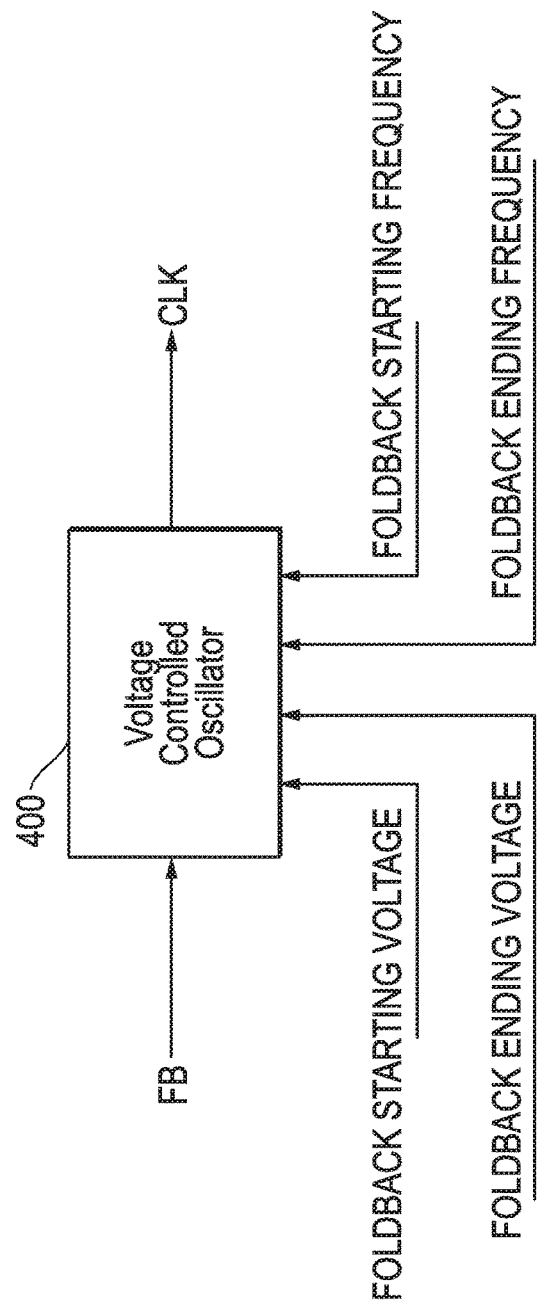
FIG. 4 illustrates a conceptual block diagram of a voltage controlled oscillator (VCO) used by the switched mode power converter of FIG. 1.

FIG. 4 illustrates a conceptual block diagram of a voltage controlled oscillator (VCO) 400 used by switched mode power converter 100 of FIG. 1. VCO 400 has an input for receiving feedback signal FB, an output for providing a clock signal labeled "CLK" having a frequency that is a function of the voltage of the FB signal, and four control inputs for receiving signals labeled "FOLDBACK STARTING VOLTAGE", "FOLDBACK ENDING VOLTAGE", "FOLDBACK STARTING FREQUENCY", and "FOLDBACK ENDING FREQUENCY" that correspond to the values shown in graph 200 of FIG. 2. In some embodiments, such as the examples shown in FIG. 3, the FEEDBACK STARTING VOLTAGE and FEEDBACK STARTING FREQUENCY are set internally to meaningful values in a switched mode power supply controller chip, whereas the FOLDBACK ENDING VOLTAGE and FOLDBACK ENDING FREQUENCY are fully programmable by the user in a manner that will be described further below. Since it is important to set the FOLDBACK STARTING FREQUENCY above the human audible range to avoid audible noise, for example 25 kHz, this constraint still allows significant user flexibility while reducing cost by saving a programming pin on the chip. Likewise, setting the FOLDBACK STARTING VOLTAGE internally to a convenient voltage still allows the user to adapt to different desired values of VOUT by the design of the feedback circuit, and thus allows most of the flexibility of full programmability while reducing cost by saving a programming pin on the chip. In other embodiments, any combination of these inputs can be user programmable or internally set.

Figure 5:
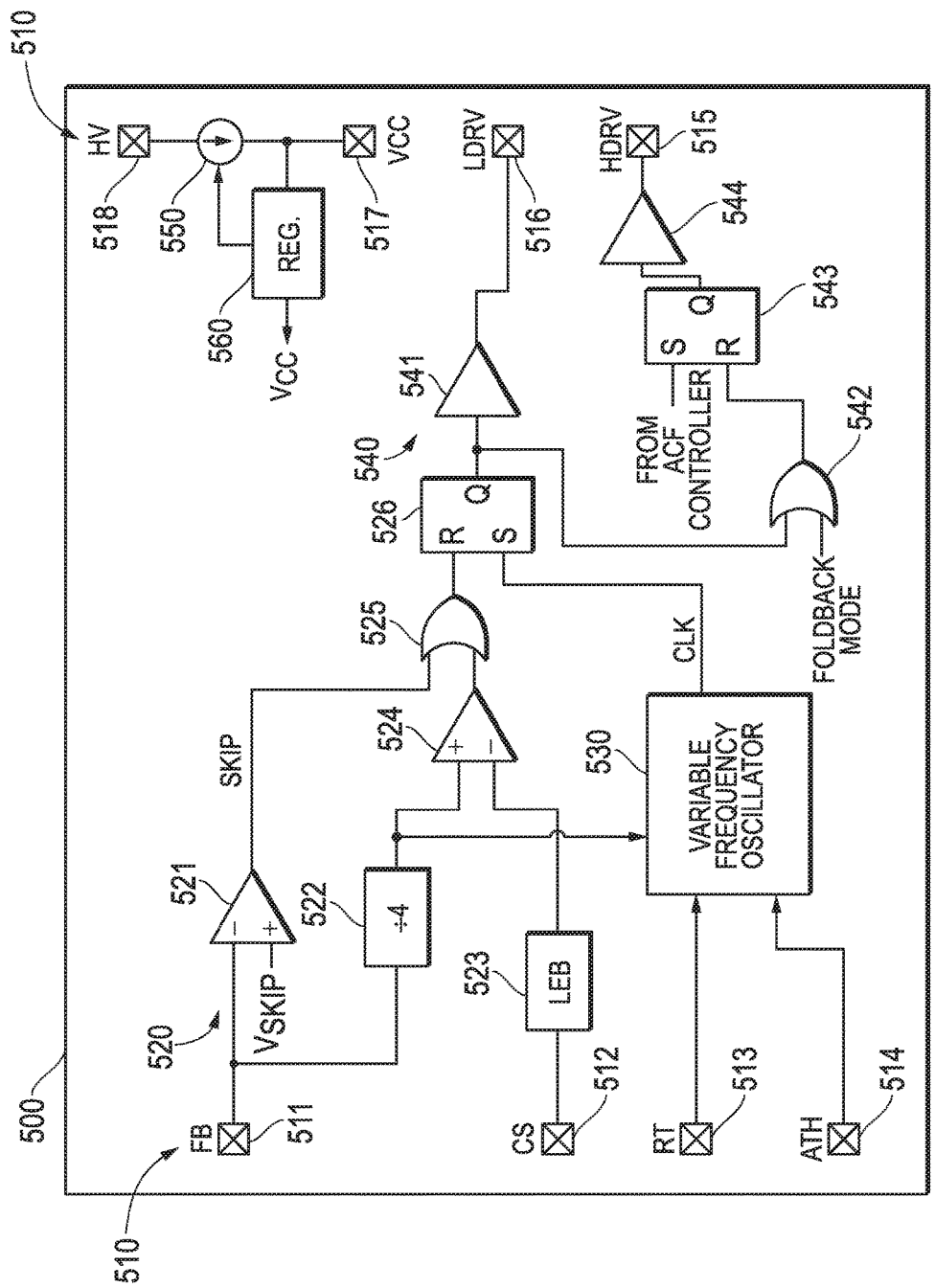
FIG. 5 illustrates in partial block diagram and partial schematic form a switched mode power supply controller that can be used as the switched mode power supply controller of FIG. 1.

FIG. 5 illustrates in partial block diagram and partial schematic form a switched mode power supply controller 500 that can be used as switched mode power supply controller 190 of FIG. 1. Switched mode power supply controller 500 includes generally a set of external terminals 510, a pulse width modulator (PWM) circuit 520, a variable frequency oscillator 530, a driver circuit 540, a current source 550, and a regulator 560. External terminals 510 include an FB terminal 511, a CS terminal 512, an RT terminal 513, an ATH terminal 514, an HDRV terminal 515, an LDRV terminal 516, a VCC terminal 517, and an HV terminal 518.

PWM circuit 520 includes a comparator 521, a divider 522, a leading edge blanking (LEB) circuit 523, a comparator 524, an OR gate 525, and a PWM latch 526. Comparator 521 has an inverting input connected to FB terminal 511, a non-inverting input for receiving a skip voltage labeled "$V_{SKIP}$", and an output for providing a signal labeled "SKIP". Divider 522 has an input terminal connected to FB terminal 511, and an output terminal. LEB circuit 523 has an input connected to CS terminal 512, and an output. Comparator 524 has a non-inverting input connected to the output of divider 522, an inverting input connected to the output of LEB circuit 523, and an output. OR gate 525 has a first input connected to the output of comparator 521, a second input connected to the output of comparator 524, and an output. PWM latch 526 is an SR-type latch and has an R input connected to the output of OR gate 525, an S input for receiving the CLK signal, and a Q output.

Variable frequency oscillator 530 has a first input connected to the output of divider 522, a second input connected to RT terminal 513, a third input connected to ATH terminal 514, and an output for providing the CLK signal.

Driver circuit 540 includes a driver 541, an OR gate 542, an SR latch 543, and a driver 544. Driver 541 has an input connected to the Q output of PWM latch 526, and an output connected to LDRV terminal 516. OR gate 542 has a first input connected to the Q output of PWM latch 526, a second input for receiving a signal labeled "FOLDBACK MODE", and an output. SR latch 543 has an S input for receiving an output of an ACF controller (not shown in FIG. 5), an R input connected to the output of OR gate 542, and a Q output. Driver 544 has an input connected to the Q output of SR latch 543, and an output connected to HDRV terminal 515.

Current source 550 has an input terminal connected to HV terminal 518, an output terminal connected to VCC terminal 517, and a control terminal. Regulator 560 has an input connected to the output of current source 550, an output for providing a signal labeled "$V_{CCINT}$", and a control output connected to the control input of current source 550.

Switched mode power supply controller 500 is an integrated circuit that operates as an ACF controller and is suitable for use as switched mode power supply controller 190 of FIG. 1. In other embodiments it could be modified to operate as a fixed frequency flyback controller with dynamic frequency foldback as described herein.

On system startup, HV terminal 518 is used to ramp the voltage on $V_{CCINT}$ quickly before auxiliary winding 123 is able to supply sufficient current to power the circuits inside switched mode power supply controller 500. Regulator 560 makes current source 550 operational and the HV pin provides startup current to charge capacitor 184. Regulator 560 also provides $V_{CCINT}$ to the internal circuits of switched mode power supply controller 500 based on the voltage on VCC terminal 517.

After startup for medium and heavy loads, switched mode power supply controller 500 operates in ACF mode and uses the magnetizing currents in primary winding 121 to achieve ZVS. The ACF controller activates the LDRV and HDRV signals in a manner that is well known in the art and will not be described further here.

For light loads, switched mode power supply controller 500 operates in DCM foldback mode using dynamic frequency foldback as described herein. Variable frequency oscillator 530 receives a scaled version of the FB signal output from divider 522 and uses it to generate the clock signal. The FOLDBACK STARTING FREQUENCY is set internally to 25 kHz in variable frequency oscillator 530 and the FOLDBACK ENDING VOLTAGE is set internally to 0.4 volts. The user, however, can set the FOLDBACK ENDING VOLTAGE and the FOLDBACK ENDING FREQUENCY using the ATH and RT terminals, respectively. PWM circuit 520 compares the divided value of $V_{FB}$ to the current sense signal to vary the on time of transistor 151, while transistor 163 remains non-conductive.

For very light loads, such as when the load transitions to a standby state or is turned fully off, switched mode power supply controller 500 operates in skip mode. Comparator 521 determines whether $V_{FB}$ is less than $V_{SKIP}$, which corresponds to the FOLDBACK STARTING VOLTAGE. In this case switched mode power supply controller 500 uses the value of $V_{SKIP}$, i.e. 0.4 volts, to enter skip mode and to deactivate PWM circuit 520. When $V_{FB}$ is less than $V_{SKIP}$, comparator 521 provides the SKIP signal in a high state, which propagates through OR gate 525 to keep PWM latch 526 reset and prevent transistor 151 from being active.

When $V_{FB}$ subsequently rises above 0.4 volts, such as when the load transitions from a standby state to an active state, switched mode power supply controller 500 returns to DCM foldback mode and remains in DCM foldback mode with variable frequency oscillator 530 providing a CLK signal proportional to $V_{FB}$ until $V_{FB}$ rises above the FOLDBACK ENDING VOLTAGE. Note that switched mode power supply controller 500 could be implemented as a fixed frequency flyback controller operating at the FOLDBACK ENDING FREQUENCY for medium and heavy loads using variable frequency oscillator 530. In this case, the ACF controller, HDRV terminal 515, OR gate 542, SR latch 543, driver 544 could all be omitted.

Figure 6:
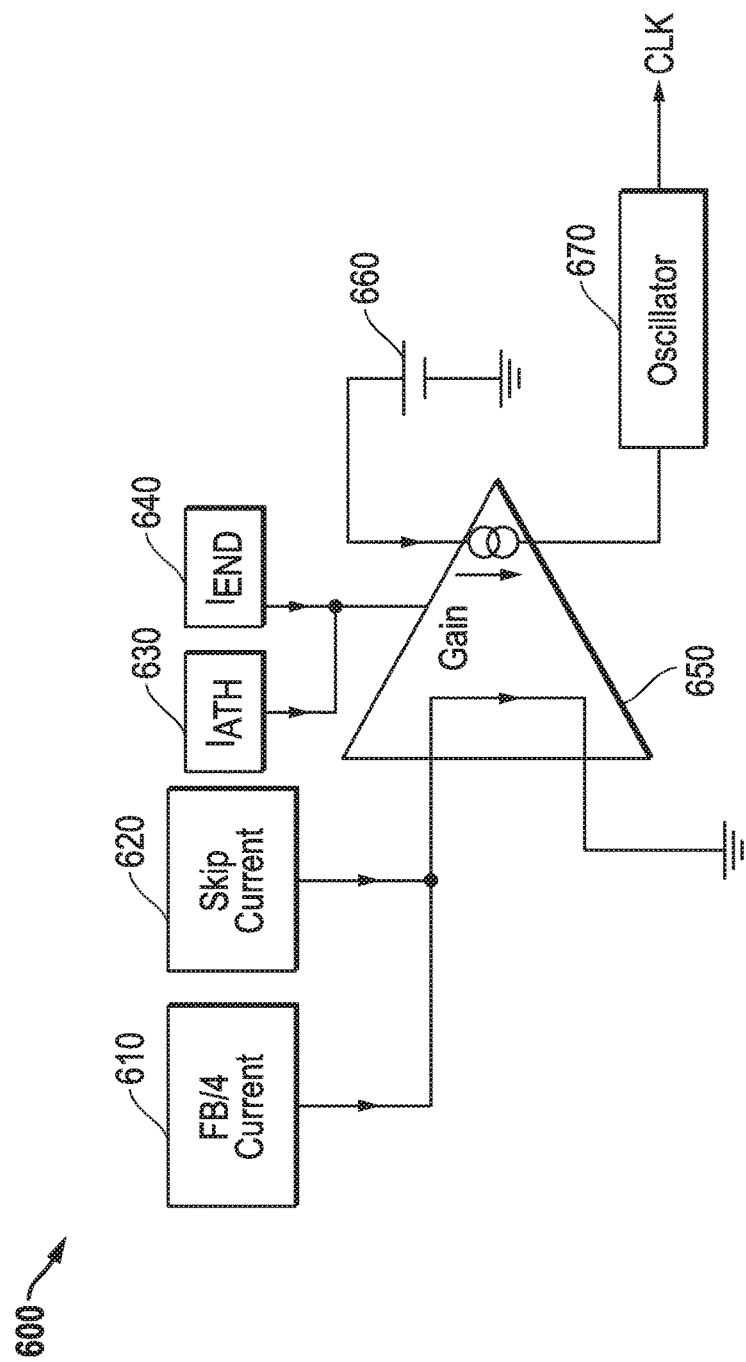
FIG. 6 illustrates in partial block diagram and partial schematic form a variable frequency oscillator that can be used to implement the variable frequency oscillator of FIG. 5.

FIG. 6 illustrates in partial block diagram and partial schematic form a variable frequency oscillator 600 that can be used to implement variable frequency oscillator 530 of FIG. 5. Overall, variable frequency oscillator 600 is a voltage controlled oscillator that converts its input voltage $V_{FB}/4$ to a clock signal with a frequency proportional to voltage $V_{FB}/4$, but operates internally in the current domain.

Variable frequency oscillator 600 includes a variable current source 610, a fixed current source 620, variable current sources 630 and 640, an amplifier 650, a voltage source 660, and a current controlled oscillator 670. Variable current source 610 provides a variable current proportional to $V_{FB}$, and more precisely, a current proportional to $V_{FB}/4$. Fixed current source 620 provides a skip current that causes variable frequency oscillator 600 to provide the CLK signal at 25 kHz while switched mode power supply controller 500 remains in skip mode at very light loads. Thus the skip current is proportional to and indicates the FOLDBACK STARTING FREQUENCY. These currents are summed together to form a composite current that is input to amplifier 650. Variable current source 630 provides a current labeled "$I_{ATH}$" that is proportional to the value of resistor 174 connected to ATH terminal 514. Variable current source 740 provides a current labeled "$I_{END}$" that is proportional to the value of resistor 173 connected to RT terminal 513. These currents are summed together to form a composite current that sets the gain of amplifier 650.

Amplifier 650 is a variable gain current amplifier. The input current is equal to the sum of the FB/4 current and the skip current and multiplies the sum by the gain determined by the sum of currents $I_{ATH}$ and $I_{END}$ to provide an output current to current controlled oscillator 670. Current controlled oscillator 670 provides the CLK signal at a frequency proportional to its input current.

Internally, variable frequency oscillator 600 operates in the current domain to allow for ease of circuit manipulation. Thus for example it allows for easy summing of currents. It also allows for additional features sometimes associated with switched mode power supply oscillators to be added, such as line voltage scaling, ramp up/ramp down scaling, and jitter frequency offsets for spreading the noise spectrum. These features are well known and will not be described further.

Thus various embodiments of a switched mode power converter, a switched mode power supply controller, and a corresponding method using dynamic frequency foldback have been described. Dynamic frequency foldback provides programmable values for foldback starting and ending frequencies as well as the corresponding starting and ending voltages. These values can be programmed by circuit design inside a switched mode power supply controller chip, programmed externally to the chip through programmable components, or programmed with some combination of the two. For example, the foldback starting frequency and voltage can be set by the circuit design, while the foldback ending frequency and voltage set by the user.

The above-disclosed subject matter is to be considered illustrative, and not restrictive, and the appended claims are intended to cover all such modifications, enhancements, and other embodiments that fall within the true scope of the claims. For example, the particular values of starting and ending frequencies and voltages that a switched mode power supply controller chip supports can vary in different embodiments. Moreover dynamic foldback can be used in different switch mode power supply converter architectures. For example, dynamic foldback can be used for light loads in both conventional flyback converters and ACF converters.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A switched mode power supply controller with frequency foldback, comprising:
   a pulse width modulator responsive to a clock signal to generate a drive signal having a pulse width that varies in response to a feedback signal; and
   a variable frequency oscillator having a first input for receiving said feedback signal, a control input for receiving a control signal defining a foldback starting frequency, a foldback ending frequency, a foldback starting voltage, and a foldback ending voltage, and an output for providing said clock signal having a variable frequency that varies over a range between said foldback starting frequency and said foldback ending frequency as said feedback signal varies between said foldback starting voltage and said foldback ending voltage, respectively, wherein said control signal is user programmable for at least one of said foldback starting frequency, said foldback ending frequency, said foldback starting voltage, and said foldback ending voltage.

2. The switched mode power supply controller of claim 1, wherein said control signal is user programmable for said foldback ending voltage and said foldback ending frequency.

3. The switched mode power supply controller of claim 2, wherein said control signal is set internally for said foldback starting frequency.

4. The switched mode power supply controller of claim 3, wherein said foldback starting frequency is set internally above a human audible frequency.

5. The switched mode power supply controller of claim 4, wherein said foldback starting frequency is set internally to 25 kilohertz (kHz).

6. The switched mode power supply controller of claim 3, wherein said control signal is further set internally for said foldback starting voltage.

7. The switched mode power supply controller of claim 6, further comprising a reference level generator having an output for defining said foldback starting frequency, wherein said control input of said variable frequency oscillator is further coupled to said output of said reference level generator.

8. The switched mode power supply controller of claim 2, wherein said pulse width modulator and said variable frequency oscillator are combined in an integrated circuit comprising a plurality of terminals, said plurality of terminals comprising:
   a first programmable input terminal for receiving a first input signal defining said foldback ending frequency; and
   a second programmable input terminal for receiving a second input signal defining said foldback ending voltage,
   wherein said control input of said variable frequency oscillator is coupled to said first programmable input terminal and to said second programmable input terminal.

9. The switched mode power supply controller of claim 1, wherein when said feedback signal is less than said foldback starting voltage, the switched mode power supply controller operates in a skip mode.

10. The switched mode power supply controller of claim 1, wherein when said feedback signal is greater than said foldback ending voltage, the switched mode power supply controller operates in a fixed frequency mode in which said pulse width modulator switches at said foldback ending frequency.

11. The switched mode power supply controller of claim 1, wherein when said feedback signal is greater than said foldback ending voltage, the switched mode power supply controller operates in a variable frequency mode in which said pulse width modulator switches at a frequency that depends on another condition.

12. The switched mode power supply controller of claim 1, wherein said control signal is user programmable for a plurality of said foldback starting frequency, said foldback ending frequency, said foldback starting voltage, and said foldback ending voltage.

13. A switched mode power converter with frequency foldback, comprising:
   an inductive element having an input for receiving an input voltage, and an output for providing an output voltage;
   a switch having a first current electrode coupled to a terminal of said inductive element, a second current electrode coupled to a power supply terminal, and a control electrode for receiving a drive signal;
   a feedback circuit having an input coupled to said output of said inductive element, and an output for providing a feedback signal; and
   a switched mode power supply controller, comprising:
      a pulse width modulator responsive to a clock signal having an output coupled to said control electrode of said switch, wherein said pulse width modulator generates said drive signal with a pulse width that varies in response to said feedback signal; and
      a variable frequency oscillator having a first input for receiving said feedback signal, a control input for receiving a control signal defining a foldback starting frequency, a foldback ending frequency, a foldback starting voltage, and a foldback ending voltage, and an output for providing said clock signal having a variable frequency that varies over a range between said foldback starting frequency and said foldback ending frequency as said feedback signal varies between said foldback starting voltage and said foldback ending voltage, respectively,
   wherein said switched mode power converter programs at least one of said foldback starting frequency, said foldback ending frequency, said foldback starting voltage, and said foldback ending voltage through at least one terminal of said switched mode power supply controller.

14. The switched mode power converter of claim 13, wherein the switched mode power converter programs said foldback ending voltage and said foldback ending frequency.

15. The switched mode power converter of claim 14, wherein said switched mode power supply controller internally sets said foldback starting frequency.

16. The switched mode power converter of claim 15, wherein said switched mode power supply controller internally sets said foldback starting frequency above a human audible frequency.

17. The switched mode power converter of claim 16, wherein said switched mode power supply controller internally sets said foldback starting frequency to 25 kilohertz (kHz).

18. The switched mode power converter of claim 15, wherein said switched mode power supply controller further internally sets said control signal for said foldback starting voltage.

19. The switched mode power converter of claim 18, further comprising a reference level generator having an output for defining said foldback starting frequency, wherein said control input of said variable frequency oscillator is further coupled to said output of said reference level generator.

20. The switched mode power converter of claim 14, wherein said switched mode power supply controller is an integrated circuit comprising a plurality of terminals, said plurality of terminals comprising:
a first programmable input terminal for receiving a first input signal defining said foldback ending frequency; and
a second programmable input terminal for receiving a second input signal defining said foldback ending voltage,
wherein said control input of said variable frequency oscillator is coupled to said first programmable input terminal and to said second programmable input terminal.

21. The switched mode power converter of claim 20, further comprising:
a first resistor coupled to said first programmable input terminal for defining said foldback ending frequency; and
a second resistor coupled to said second programmable input terminal for defining said foldback ending voltage.

22. The switched mode power converter of claim 13, wherein when said feedback signal is less than said foldback starting voltage, the switched mode power supply controller operates in a skip mode.

23. The switched mode power converter of claim 13, wherein when said feedback signal is greater than said foldback ending voltage, the switched mode power supply controller operates in a fixed frequency mode in which said pulse width modulator switches at said foldback ending frequency.

24. The switched mode power converter of claim 13, wherein said control signal is programmable for a plurality of said foldback starting frequency, said foldback ending frequency, said foldback starting voltage, and said foldback ending voltage.

25. The switched mode power converter of claim 13, wherein when said feedback signal is greater than said foldback ending voltage, said switched mode power supply controller operates in a variable frequency mode in which said pulse width modulator switches at a frequency that depends on another condition.

26. The switched mode power converter of claim 25, wherein the switched mode power converter is an active clamp flyback (ACF) converter.

27. The switched mode power converter of claim 26, wherein said frequency depends on a magnetization condition of a primary winding of a transformer, and an on time of said drive signal varies with an amount of output current provided to a load.

28. A method for generating a drive signal for a switch in a switched mode power supply comprising:
receiving a feedback signal that is representative of an output voltage; and
generating a pulse width modulated signal in response to a clock signal and said feedback signal;
receiving a programmable control signal for determining a foldback starting frequency, a foldback ending frequency, a foldback starting voltage, and a foldback ending voltage, said receiving comprising receiving at least one of said foldback starting frequency, said foldback ending frequency, said foldback starting voltage, and said foldback ending voltage from a user; and
varying a frequency of said clock signal over a range between said foldback starting frequency and said foldback ending frequency as said feedback signal varies between said foldback starting voltage and said foldback ending voltage, respectively.

29. The method of claim 28 wherein said receiving further comprises:
receiving a plurality of said foldback starting frequency, said foldback ending frequency, said foldback starting voltage, and said foldback ending voltage from the user.

30. The method of claim 29, wherein said receiving further comprises:
receiving said foldback ending voltage and said foldback ending frequency from the user.

31. The method of claim 29, wherein said receiving further comprises:
setting said foldback starting frequency to a fixed frequency.

32. The method of claim 31, wherein said setting said foldback starting frequency to said fixed frequency further comprises:
setting said foldback starting frequency to a frequency above a human audible frequency.

33. The method of claim 32, wherein said setting said foldback starting frequency to said frequency above said human audible frequency comprises setting said foldback starting voltage to 25 kilohertz (kHz).

34. The method of claim 31, wherein said receiving further comprises:
setting said foldback starting voltage to a fixed voltage.

35. The method of claim 29, further comprising generating said pulse width modulated signal in a skip mode when said feedback signal is less than said foldback starting voltage.

36. The method of claim 29, further comprising generating said pulse width modulated signal in a fixed frequency mode when said feedback signal is greater than said foldback ending voltage.

* * * * *